L. J. PRESCOTT.
LINE MARKING DEVICE.
APPLICATION FILED MAY 21, 1912.
1,064,087.
Patented June 10, 1913.
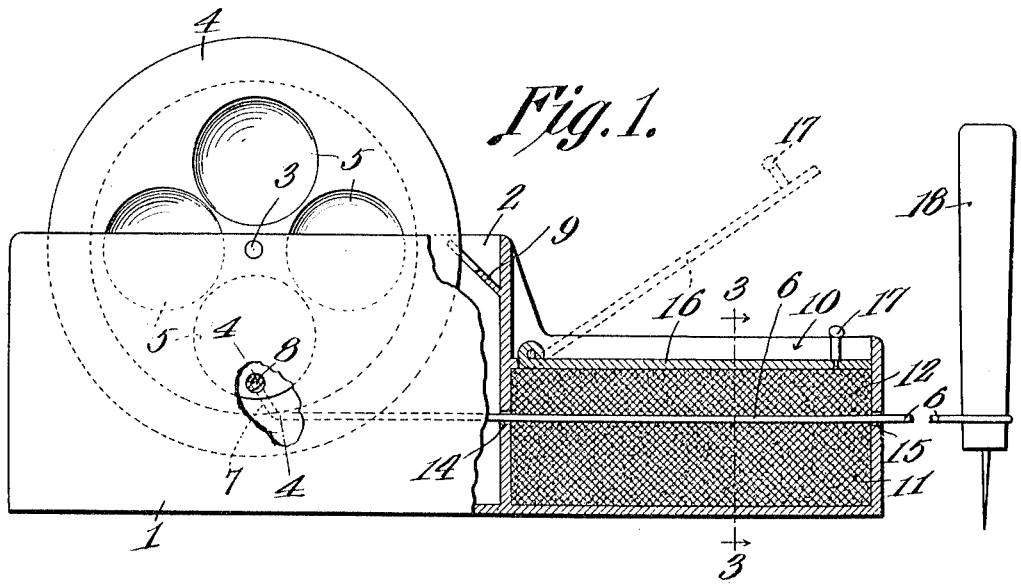
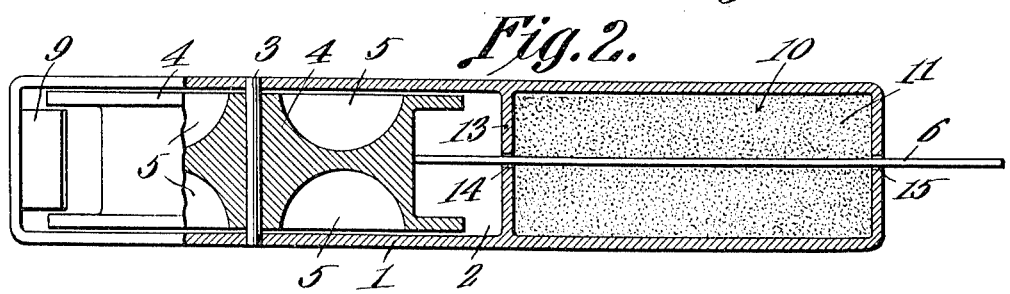
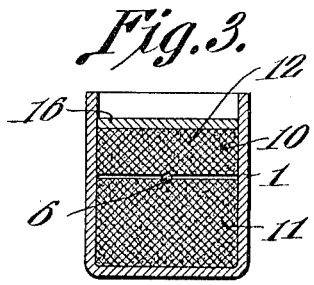
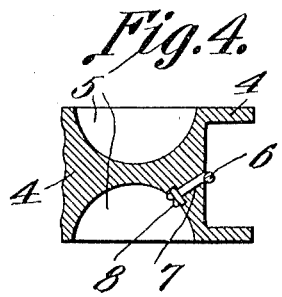
Witnesses
Lucien J. Prescott,
Inventor
by C. A. Snow & Co.
Attorneys

UNITED STATES PATENT OFFICE.

LUCIEN J. PRESCOTT, OF BELMONT, NEW YORK.

LINE-MARKING DEVICE.

1,064,087.  Specification of Letters Patent.  Patented June 10, 1913.

Application filed May 21, 1912. Serial No. 698,804.

*To all whom it may concern:*

Be it known that I, LUCIEN J. PRESCOTT, a citizen of the United States, residing at Belmont, in the county of Allegany and State of New York, have invented new and useful Improvements in Line-Marking Devices, of which the following is a specification.

This invention relates to improvements in what may be termed marking lines.

The invention has for its object to provide a line holder for readily inking or adapting the line for marking as the same is actuated or "snapped" by the action of the fingers, as in the use of the ordinary "chalk"-line.

A still further object is to provide a novel, simple, inexpensive, convenient and efficient holder of the character indicated.

The invention consists in the novel construction, arrangement, and combination of parts as hereinafter disclosed and defined by the appended claim.

In the accompanying drawing, illustrating the preferred embodiment of my invention, Figure 1 is a side elevation with parts broken away; Fig. 2 is a plan, parts being broken away; Fig. 3 is a vertical transverse section, taken on the line 3—3 of Fig. 1; Fig. 4 is a fragmentary sectional view, showing more fully the manner of attaching the marking line to its reel or winding member.

In carrying out the invention, there has been provided an elongated receptacle 1 having a partition 13 intermediate its ends forming the compartments 2 and 10, the compartment 2 being relatively deep and the other compartment being relatively shallow. A reel 4 is held in the compartment 2 by means of an axle 3 engaging the sides of the compartment adjacent their upper edges. The partition 13 is provided with an aperture 14 and the other end of the shallow compartment is provided with an aperture 15, said apertures being on a line tangential with the bottom of the reel 4. Said reel 4 is suitably recessed or hollowed out laterally as at 5, to render it skeleton-like or light in weight.

A suitable marking line 6, preferably of twine, or otherwise constituted, has one end connected to the reel 4, the connection being preferably effected by passing the line through an oblique passage 7 in the reel and knotting the line as at 8, at the requisite end, said passage terminating at its ends centrally in the periphery and at one side of the reel, respectively. The line 6 is passed outward through the apertures 14 and 15 and its outer end is attached to a "sticking" awl 18.

Suitable guards 9 are secured, in any practicable way, within the compartment 2 of the casing 1 and are so arranged or disposed with respect to the periphery of the reel as to retain the marking line against casual displacement as it is unwound therefrom or rewound thereon.

An inking pad 11 is arranged in the bottom of the compartment 10 and is on a level with the apertures 14 and 15. An upper inking pad is arranged within the compartment 10 and rests on the pad 11 over the line 6, a cover 16 being hinged within the compartment 10 directly above the upper pad 12 in order to swing against the said pad. One end of the said cover is hinged within the compartment 10 adjacent the partition 13 and the finger piece 17 is secured to the free end of the said cover for convenience in raising the same.

In use, it being understood that the pads 11 and 12 have been supplied with suitable ink, and the line being wound on the reel 4, the line may be inked or adapted for marking by drawing the same outward and unwinding it from the reel, as will be evident. It will be noted that the amount of ink transmitted to the line from the pads will be governed by the pressure given to bear on the cover 16, it being preferable to apply pressure to the cover 16 by the thumb. Thus, the line may be inked according to the requirements, and the line may be "snapped" in the manner of a chalk line for the purpose of marking, as is well known to those versed in the art. The impression made by the inked line will be distinct and will not be as fugitive as the ordinary chalk mark, and it is also possible to shade the mark according to the force with which the cover 16 is depressed.

It will be noted that the upper portion or a substantial part of the reel is exposed in order that the reel may be spun or revolved by the hand for winding up or reeling the line, and that the ink bearing pads provide a suitable marking agent surrounding the line for coating same, the cover being hinged to the receptacle in such a manner as to retain the marking agent within its compartment and in order that the marking agent may be pressed against the line. The whole device is so proportioned as to be graspable in one hand with the first thumb phalange on the hinged cover and the ball of the thumb at the side face of the reel so as to control both the coating and the unreeling of the line. This is of particular advantage for the reason that when the stick awl is properly engaged to an object, the receptacle may be held in the hand as specified and may be carried away from the stick awl so as to unreel the line, the reel being prevented from spinning or revolving too fast by pressing the ball of the thumb against the side face thereof, and the coating of the line being regulated by the pressure of the first thumb phalange on the hinged cover.

What is claimed is:—

A device of the class specified embodying an elongated receptacle having a partition intermediate its ends forming two compartments, a reel journaled in one compartment with a substantial portion thereof exposed, a line connected to the reel and passing outwardly through the partition and the end of the other compartment, a marking agent in the latter compartment surrounding the line for coating same, and a cover hinged within the latter compartment to permit the marking agent to be pressed against the line, the whole being so proportioned as to be graspable in one hand with the first thumb phalange on the hinged cover and the ball of the thumb at the side face of the reel to control both the coating and the unreeling of the line.

In testimony that I claim the foregoing as my own, I have hereto affixed my signature in the presence of two witnesses.

LUCIEN J. PRESCOTT.

Witnesses:
 LEO W. PIKE,
 CHAS. E. MILLS.

---

Copies of this patent may be obtained for five cents each, by addressing the "Commissioner of Patents, Washington, D. C."